(12) United States Patent
Cizio

(10) Patent No.: US 7,983,918 B2
(45) Date of Patent: Jul. 19, 2011

(54) AUDIO INSTRUCTION SYSTEM AND METHOD

(75) Inventor: Chester T. Cizio, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 803 days.

(21) Appl. No.: 11/956,766

(22) Filed: Dec. 14, 2007

(65) Prior Publication Data

US 2008/0154607 A1    Jun. 26, 2008

(51) Int. Cl.
*G10L 13/00* (2006.01)
(52) U.S. Cl. .......................... 704/258; 704/272; 704/260
(58) Field of Classification Search .................. 704/258, 704/260, 275, 266, 231, 270, 272, 270.1; 379/88.01
See application file for complete search history.

(56) References Cited

U.S. PATENT DOCUMENTS

| | | | | |
|---|---|---|---|---|
| 6,456,973 B1 * | 9/2002 | Fado et al. | ..................... | 704/260 |
| 6,477,500 B2 * | 11/2002 | Maes | ............................ | 704/275 |
| 7,400,712 B2 * | 7/2008 | August | ...................... | 379/88.01 |
| 2003/0028380 A1 * | 2/2003 | Freeland et al. | .............. | 704/260 |

* cited by examiner

*Primary Examiner* — Huyen X. Vo
(74) *Attorney, Agent, or Firm* — John A. O'Toole; David D'Zurilla

(57) ABSTRACT

A device and method for assisting a human user in performing processes includes a speaker that provides audible instructions to the user corresponding to multiple tasks associated with performing the process. A storage device stores data corresponding to the audible instructions. A processor converts the stored data to the audible instructions, and an input device is adapted to enable the user to control the provision of the audible instructions.

19 Claims, 9 Drawing Sheets

AUDIO INSTRUCTION SYSTEM AND METHOD

BACKGROUND

In many manufacturing environments, machines may need to be modified when a manufacturing process or product being manufactured changes. This is referred to as an equipment changeover. A complex series of steps may need to be performed to change over the equipment to make the new or changed product. In some cases, this may be done infrequently, and operators may need to refer frequently to a paper list of instructions in order to perform the changeover correctly. This can take a significant amount of time to do, as the operator may need to put down tools, and refer back to the paper copy of instructions in order to perform the next task in the changeover.

If the changeover occurs frequently, the operator may soon be able to perform the changeover with less frequent reference to the paper copy of the instructions. In some cases, the instructions may be stored on a personal digital assistant (PDA) or a human machine interface (HMI) such as an interactive display screen or selector panel instead of paper. However, reference to the PDA or HMI is then required many times during the changeover process. Still further, employee turnover may mean that inexperienced operators may be performing the changeover. Such conditions can lead to significant down time of manufacturing lines. Other examples of these types of infrequent/potentially complex operations include equipment maintenance or repair, and even complex product assembly processes that may be performed infrequently, or may require a significant number of steps such that accurate memorization and performance of the task is difficult to achieve.

There is a need for a system and method that minimizes the time needed to perform such tasks, and results in less down time for manufacturing or other assets.

DETAILED DESCRIPTION

Figure 1:
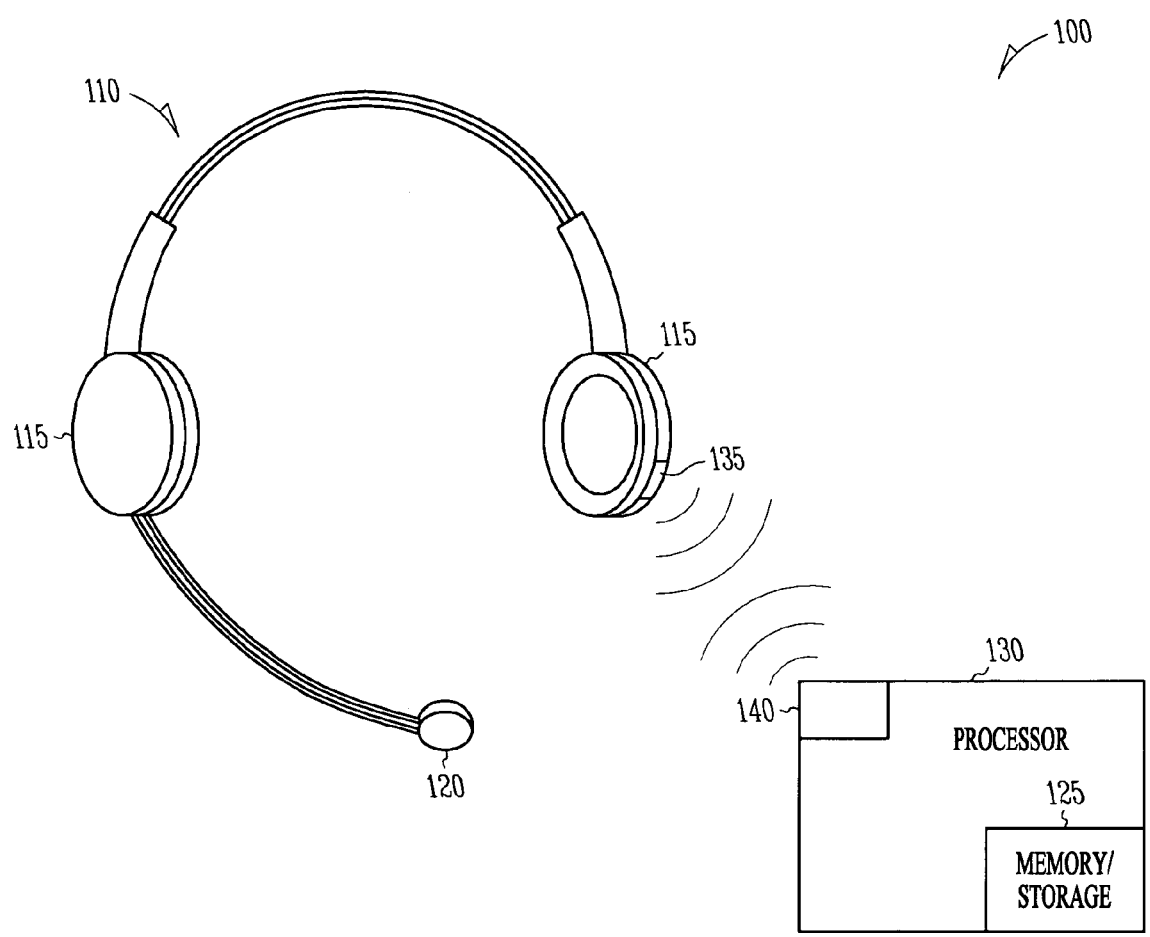
FIG. 1 is a block diagram of a system for providing audio instruction according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In one embodiment, a transceiver is built into a headset that is worn by the end user. The end user interacts with a programmed system for providing audible instructions through the headset when a choice is required such as a pause, repeat request, acknowledgement or advancement of the system. For the most part, the end user listens and responds to the instruction given. The response can take the form of some action by the end user. If interaction is required, this may be accomplished by depressing a button or sequence of buttons on the headset or through other means such as voice activation or remote panel intervention.

Corresponding software that is executed and interacts with the headset may be described as a program that takes written input and outputs audible instructions to the headset via a voice simulator. A sequence of audio files may also be used in further embodiments. This written input is in a spreadsheet format in one embodiment, allowing a technical writer to insert/delete instruction as well as the ability to add/modify time constraints. Written code from a PLC, for example, can be used to output an audio instruction or provide an update to the end user based on the program status of a given system. Instructions provided to the user by the simulator may be followed by interactive commands such as time based pauses with or without continuance. These instructions can be influenced by the end user through interaction with the headset or remote panel intervention.

FIG. 1 illustrates a system 100 that assists a human user in performing processes. System 100 in one embodiment includes a headset 110 with speakers 115. The headset 110 may also include a microphone 120 for accepting audible instructions from the user. Audible instructions are provided to the user via the speaker 115, corresponding to multiple tasks associated with performing the process. A storage device 125 stores data, such as text, corresponding to the audible instructions. A processor 130 converts the stored data to the audible instructions, such as by speech synthesis, or directly playing of audio files corresponding to the tasks.

The microphone 120 is an input device adapted to enable the user to control the provision of the audible instructions by speech commands, such as stop, go and back. These commands may be changed to different words, but generally correspond to stopping the provision of instructions for a task and waiting for a go command to resume the provision of the instruction. The back command corresponds generally to going back to a previous task and providing audible instructions for such previous task.

In one embodiment, the stored data includes temporal information related to the rate of providing the instructions for the multiple tasks. The stored data may also include different sets of tasks for the process corresponding to different user experience levels in performing the process.

In one embodiment, the headset comprises a transceiver 135 wirelessly coupled to the processor via a processor transceiver 140. The processor may include a program that allows selection of a set of audible instructions to change an assembly line from being set up to produce a current product to produce a second product to be produced on the assembly line. The processor may also provide a list of the tasks and a status as the audible instructions that are being provided. The processor may provide an interface to jump to a task and automatically mark previous tasks as completed. An interface may also be provided to define tasks and descriptions to be audibly provided. In one embodiment, the interface further facilitates defining times associated with each task. In yet a further embodiment, the processor interface provides for selection of a voice recognition profile or a training mode to generate a voice recognition profile for each user.

Figure 2:
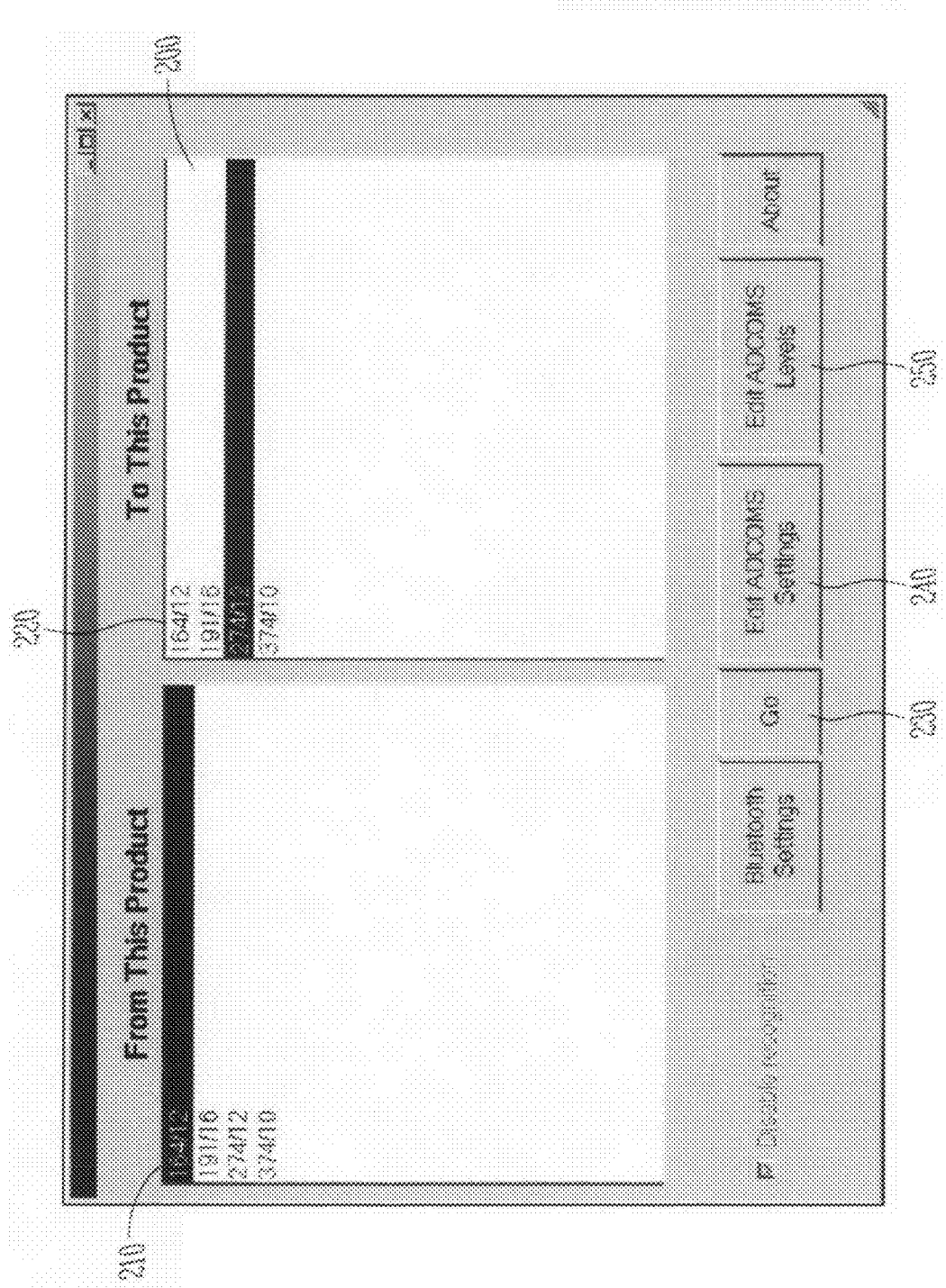
FIG. 2 is a screen shot representation of a product changeover selection interface according to an example embodiment.

FIG. 2 is a screen shot of an example user interface 200 for selecting production equipment to be changed over or modified from producing one product to another product. The selection will identify an audio defined changeover, operation or maintenance (ADCOMS) file that may be used to guide a user through a process corresponding to equipment to be modified.

A list of products being produced is shown at 210. A user may select one of the products that is currently being produced, corresponding to a state of the equipment to be modified. A list of products to be produced is shown at 220. The user may select products from the lists using a mouse, touchpad, or other input device, and then select a go button at 230. If one of the products is not selected from each list, a message may be provided requesting the user to select a product. The user may acknowledge such messages by clicking on an "OK" button as is commonly used in many applications. The user interface 200 may also include a settings edit button 240 that opens a window to edit ADCOMS settings.

Figure 3:
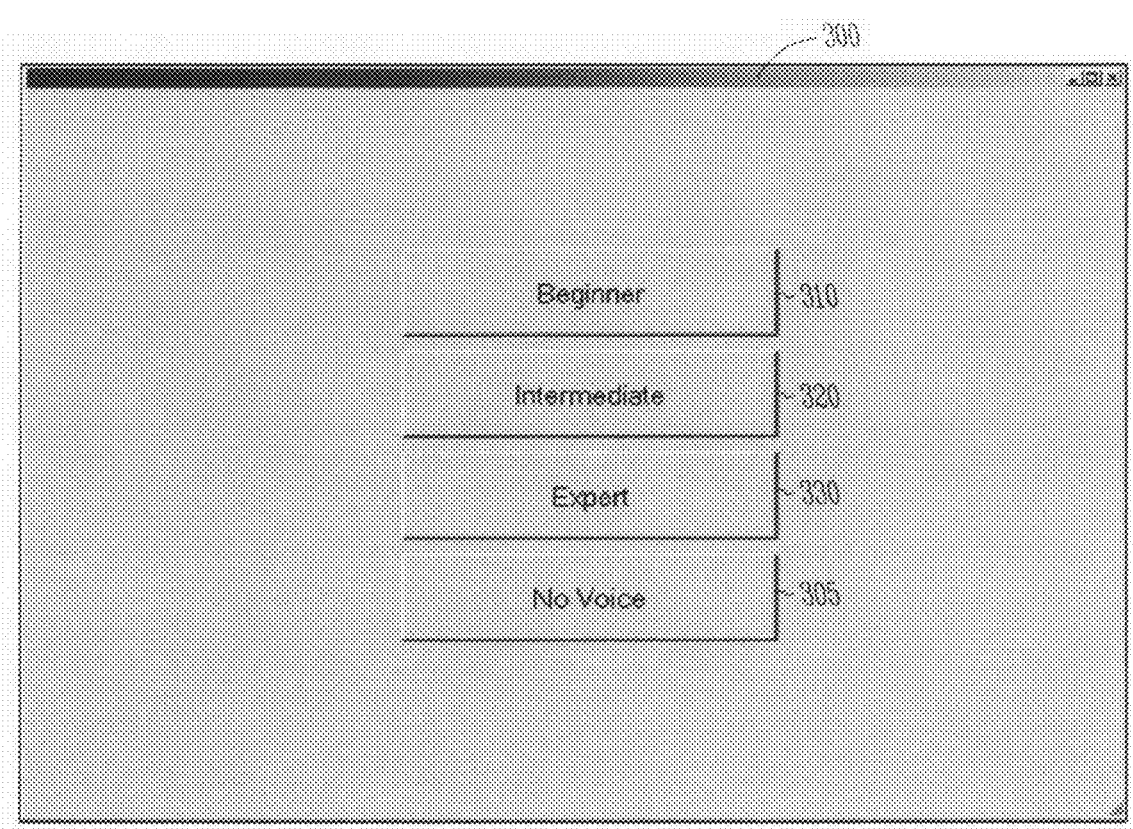
FIG. 3 is a screen shot representation of a level selection interface according to an example embodiment.

Levels may also be selected at 250, such as a beginner level, intermediate level or expert level. Each level may have its own ADCOMS file for guiding the user through the process. The levels button 250 takes the user to either a drop down menu of choices, or a separate window or selection area as shown in FIG. 3 at 300. A no voice option 305 may also be provided. The labels, beginner 310, intermediate 320 and expert 330 for each of the levels may be changed as desired. Fewer or more levels may also be provided. In further embodiments, a voice style may be selected by the user, or may be different for different processes. Different male and female voices may be used as desired depending on user preferences or processes.

Figure 4:
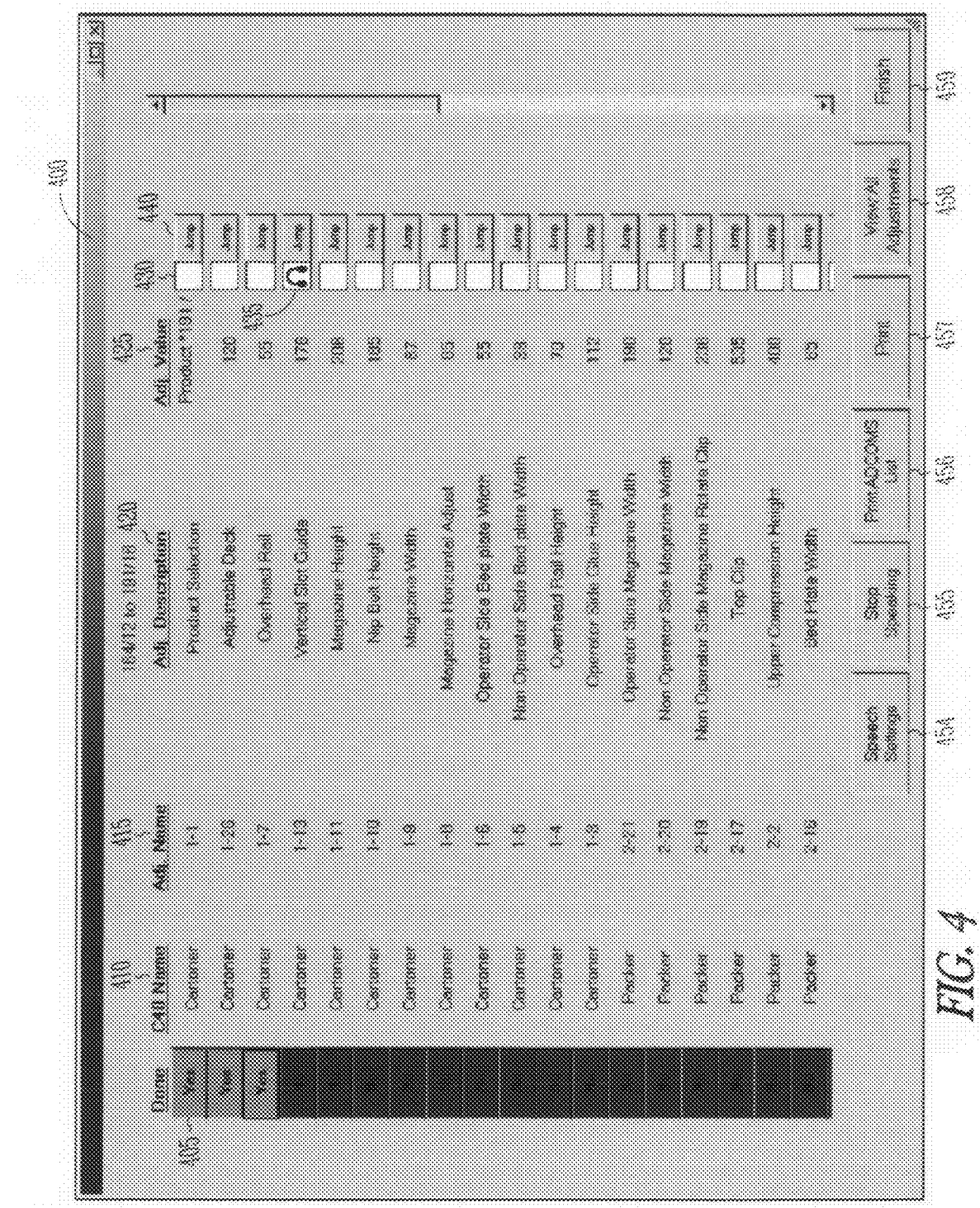
FIG. 4 is a screen shot representation of an adjustments interface according to an example embodiment.

FIG. 4 is an interactive screen 400 illustrating the progress and status of tasks for a process. A status 405 for each task is illustrated under a heading of "done" and has a value of yes or no. As shown, the first task has a part name 410 of a cartoner, has an adjustment identifier 415 of 1-1, an adjustment description 420 of "Product Selection" and an adjustment value 425 of product 191/that is being changed to. Each row corresponds to a task, and current task column 430 is dedicated to indicating which task is currently associated with audible information being provided. The current task has an indicator, such as a headphones icon 435. A jump box 440 may be used by the user to jump to another task. Such a jump may be forward or backward, and operates to update the status 405 and move the audible indicator to the task selected such that the instruction move to the task selected.

In one embodiment, several buttons are available for interacting with the ADCOMS system. A speech settings button 454 provides an interface to a screen that allows selection of a profile for a voice recognition program. A stop speaking button 455 may be used to pause the instructions. The instructions may be printed using a print list button 456. The current screen may be printed by selecting button 457. Adjustments may be viewed via button 458 and a finish button may be selected at 459. If all the tasks have not been completed when the finish button 459 is selected, a window may be provided indicating that all the tasks have not been completed and asking if the user wishes to continue.

Figure 5:
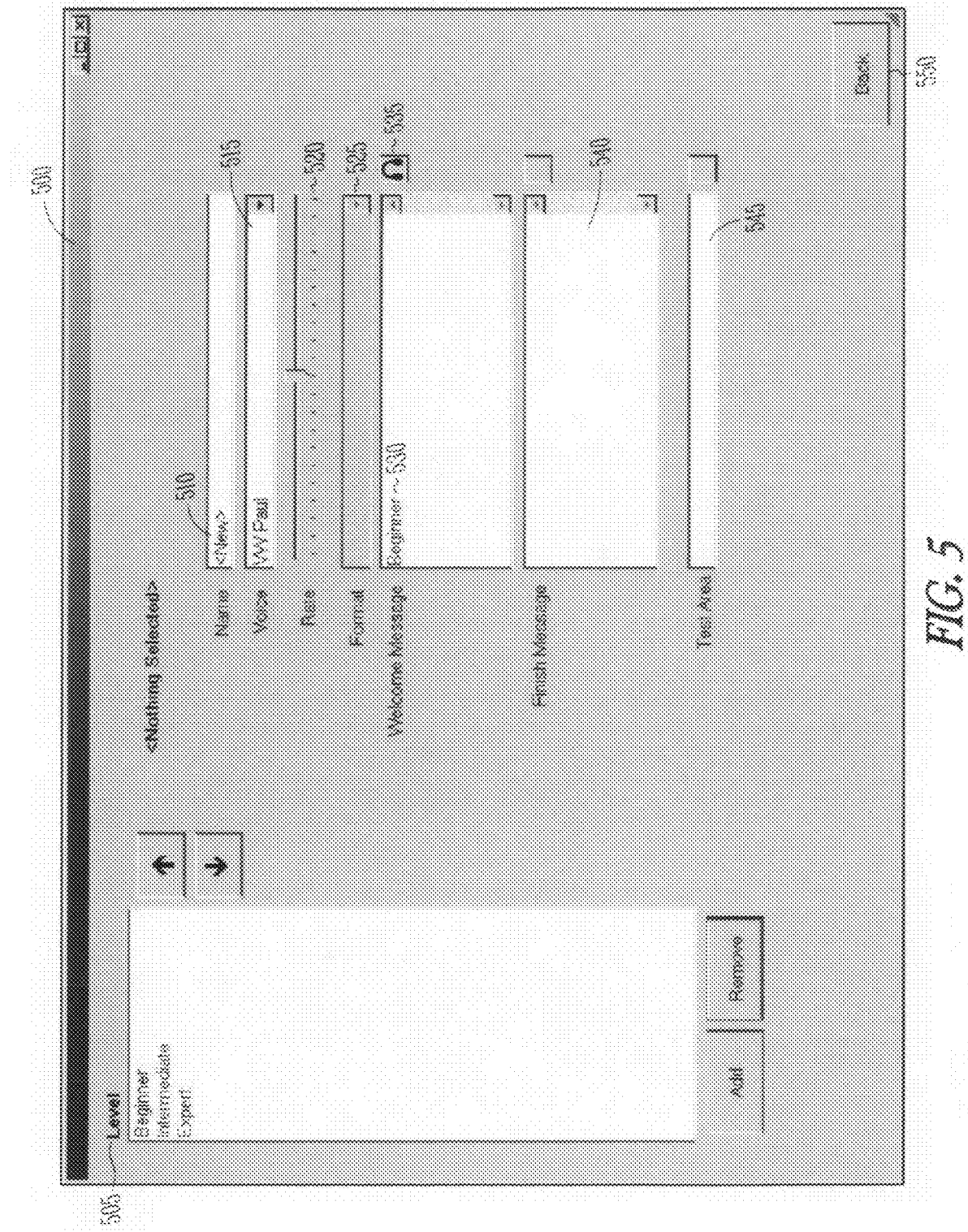
FIG. 5 is a screen shot representation of an edit levels interface according to an example embodiment.

A screen for editing levels is shown at 500 in FIG. 5. A list of levels 505 includes a beginner level, intermediate level and expert level, with the beginner level highlighted. Navigation mechanisms may be provided to scroll the list, or they may be selected with a cursor and "clicked". Editable date for the beginner level is shown on the right side of the screen in this embodiment. A name field 510 may indicate the beginner level. A voice for audible playback may be selected at 515 such as via a pull down menu. A rate for playback may be selected by use of a slide bar 520. A format field for text may be provided at 525, and may include multiple common formats for fonts, lines, paragraphs, etc. A welcome message may be provided at 530 and may be played by selection of an icon, such as the headphones icon at 535. The welcome message may be played at the beginning of the corresponding process. A finish message 540 may also be provided and is played at the completion of the corresponding process. A test area 545 may be used to provide a message to test the playback of text to test playback settings. Finally, a back button 550 may be provided to save the settings and return to a previous screen.

Figure 6:
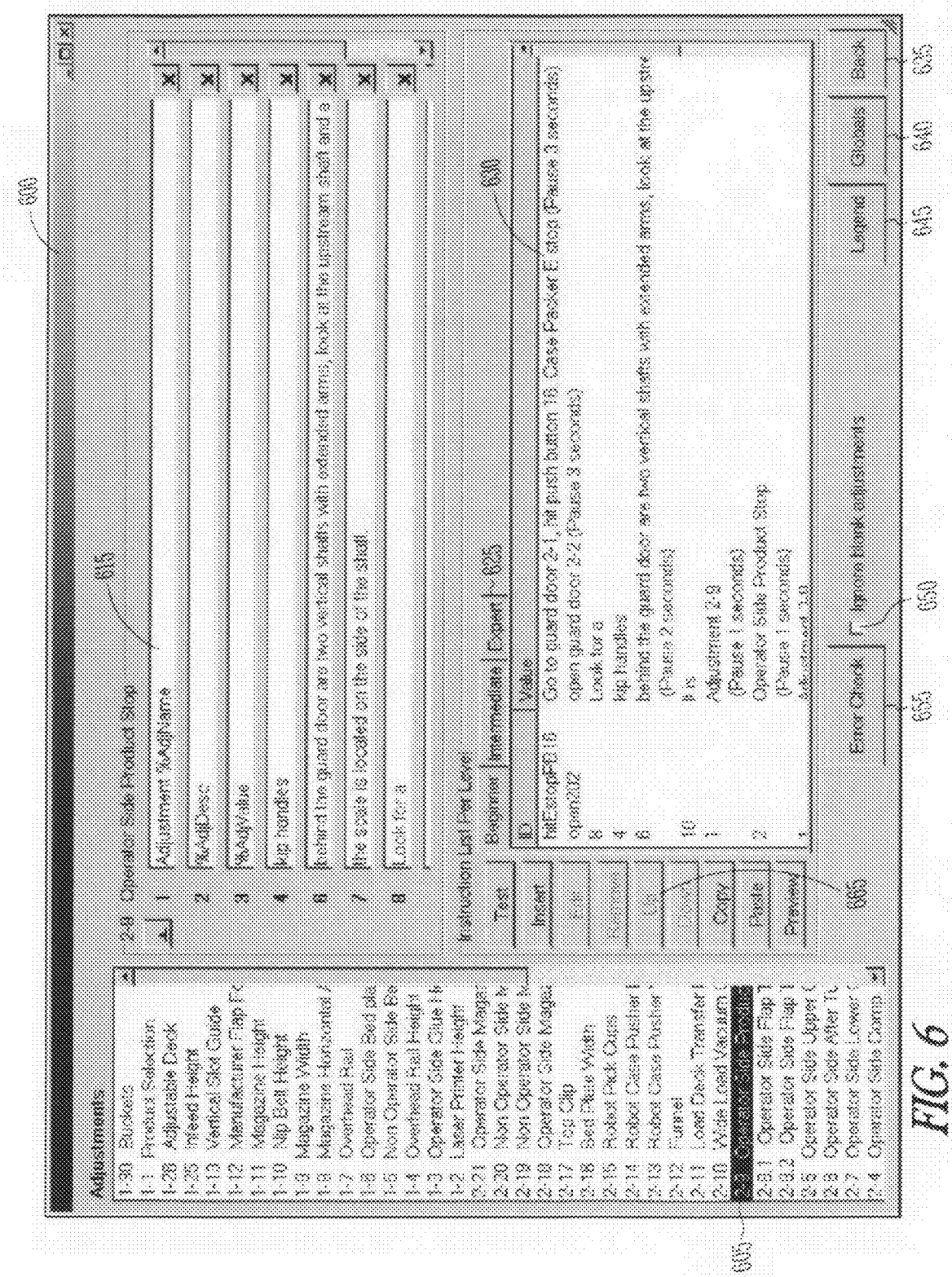
FIG. 6 is a screen shot representation of an instructions setup interface according to an example embodiment.

FIG. 6 is a screen 600 that facilitates setting up instructions for a process. It is just one way of many by which instructions may be set up. A list of adjustments or tasks is shown at 605. From the list, 2-9 Operator Side Product Stop is selected by highlighting. In one embodiment, it is a changeover adjustment. A button may be provided to add an adjustment. Text and code for specific instructions are listed at 615. The list 615 is shown as having at least 8 steps, or pieces of text, and possible more, viewable by use of a scroll bar. Steps may be deleted by use of buttons at 620.

In one embodiment a level may be detected at 625, and script, including text and commands is shown at 630 with an ID corresponding to the numbers in the list 615, text, and commands, such as pause commands. The beginner level is selected and displayed in screen 600. Several pause commands are shown, including pause 1 second, pause 3 seconds, etc. The pauses may be executed with playing of the corresponding text. Different text and commands may be provided for each of the different levels.

A back button 635 may be used to save and return to a previous window. Global text settings may be displayed by clicking or selecting button 640 and a legend may be displayed at 645. By selecting check box 650, instructions with no information may be ignored. Checking for script errors may be initiated at 655, and a preview of the selected changeover script may be performed by clicking or selecting box 660. Typical editing commands, such as insert, edit, remove, up, down, copy and paste are also provided at 665.

Figure 7:
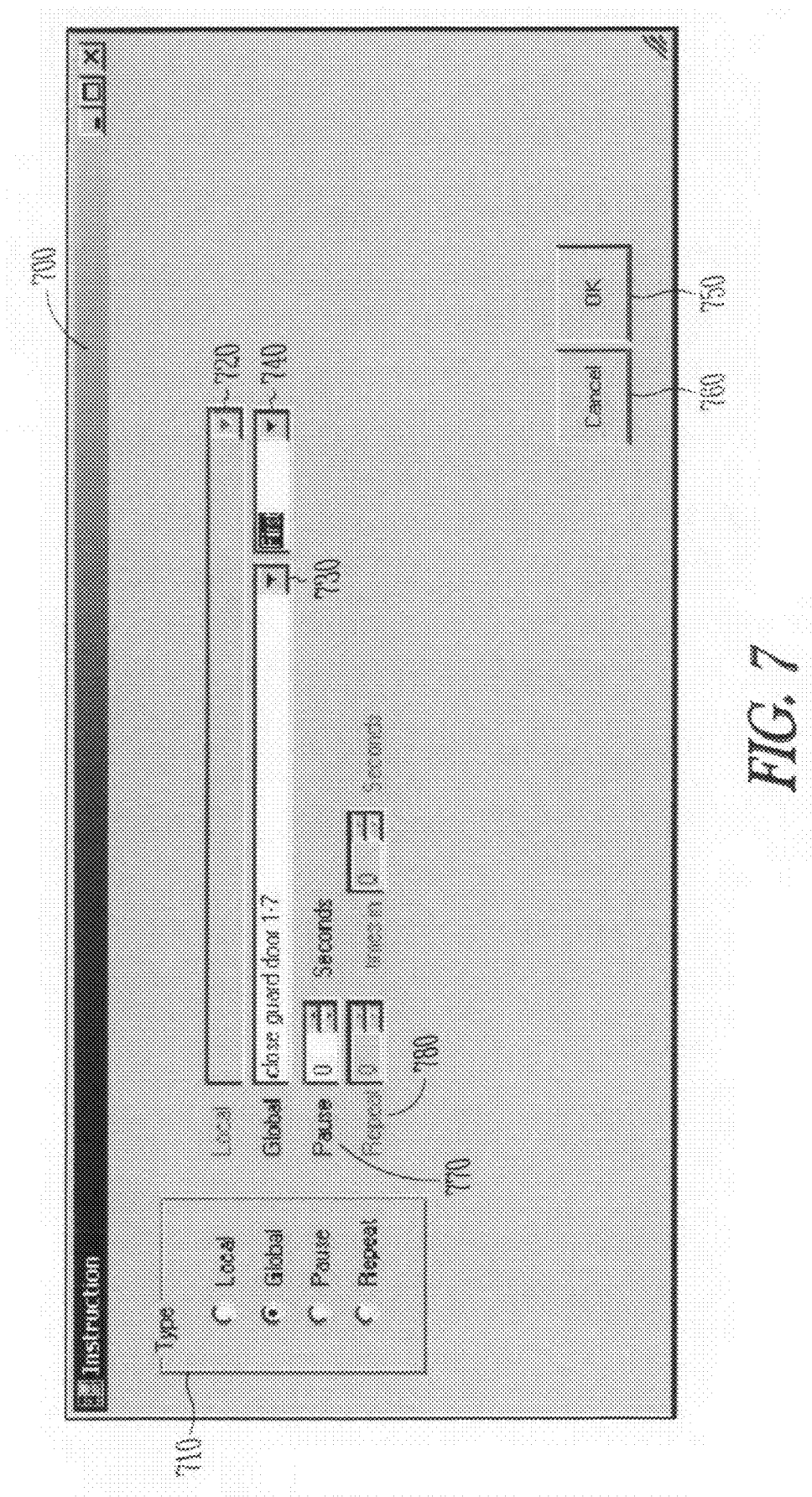
FIG. 7 is a screen shot representation of an instruction type setup selection interface according to an example embodiment.

An instruction set up screen is shown at 700 in FIG. 7. A type of instruction may first be selected as indicated at 710. A drop down menu shows local instructions at 720 and global instructions to select from are shown in a drop down menu at 730. At 740, when the instruction is read, such as normal, fast and last is selectable via a pull down menu. An ok button 750 saves the changes and closes the window 700. A cancel button 760 closes the window without retaining the changes. A pause selection up down button 770 may be used to set a pause in seconds between instructions. A repeat selection input mechanism 780 allows selection of frequency and delay of instruction repetition.

Figure 8:
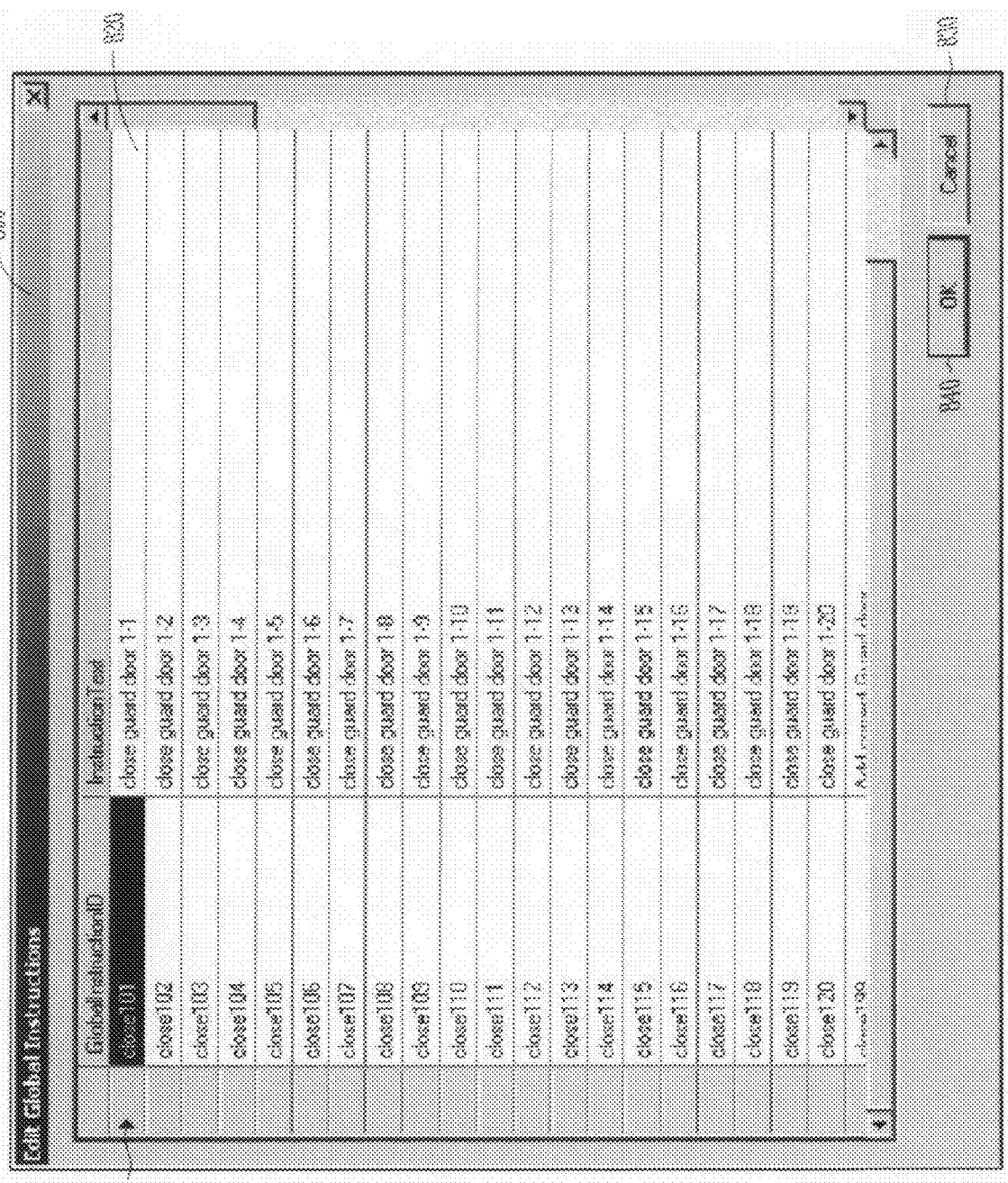
FIG. 8 is a screen shot representation of a global instruction editing interface according to an example embodiment.

FIG. 8 illustrates a screen for editing global instructions at 800. At 810, global instruction IDs are illustrated in a column. At 820, text for the corresponding global instructions are shown. A button at 830 may be used for canceling changes by closing the window without retaining the changes. At 840, a button is provided to save the changes and close the window.

For beginners, the script may provide a detailed description of the parts involved in the tasks upon first reference to the part. An example would be describing what a handle that will be adjusted looks like. After the part has been described once, further references to the handle may include shorter descriptions, or may provide no description, assuming that the user is familiar with the part.

At the beginning of a process, the instructions may include a walk around tour of the equipment being worked on to ensure the user is familiar with the equipment. This can be quite helpful when a change in the equipment occurs infrequently, such as once per month or two.

ADCOMS is an acronym for audio defined changeover, operation or maintenance. This system is a paradigm shift in the way directions may be communicated. ADCOMS provides direct audio feedback to the end user when executing changeovers, operating systems, or maintaining equipment. The use of ADCOMS may institutionalize the way users perform changeovers, operate, or maintain equipment.

ADCOMS is a time based performance system that provides regimented feedback to the end user. Its uniqueness is achieved through computer generated voice direction having a time-based capability in order for the end user to execute the given direction or instruction in a predefined time period. The system does provide for interaction by the operator whenever there is a choice of operations. The instructional quality is repeatable and serves as a platform for ongoing qualifications of new end users. ADCOMS can be designed for the beginner, novice, or expert user. The times for each operation may be set according to the expertise of the user, and is generally longer for beginners.

Various embodiments may provide one or more advantages over prior methods. ADCOMS can establish repeatable performance measures through on-the-job coaching unlike other systems that rely exclusively on knowledge skills. ADCOMS can also be used to refresh learning skills as well as reinforce safety and operations skills.

Figure 9:
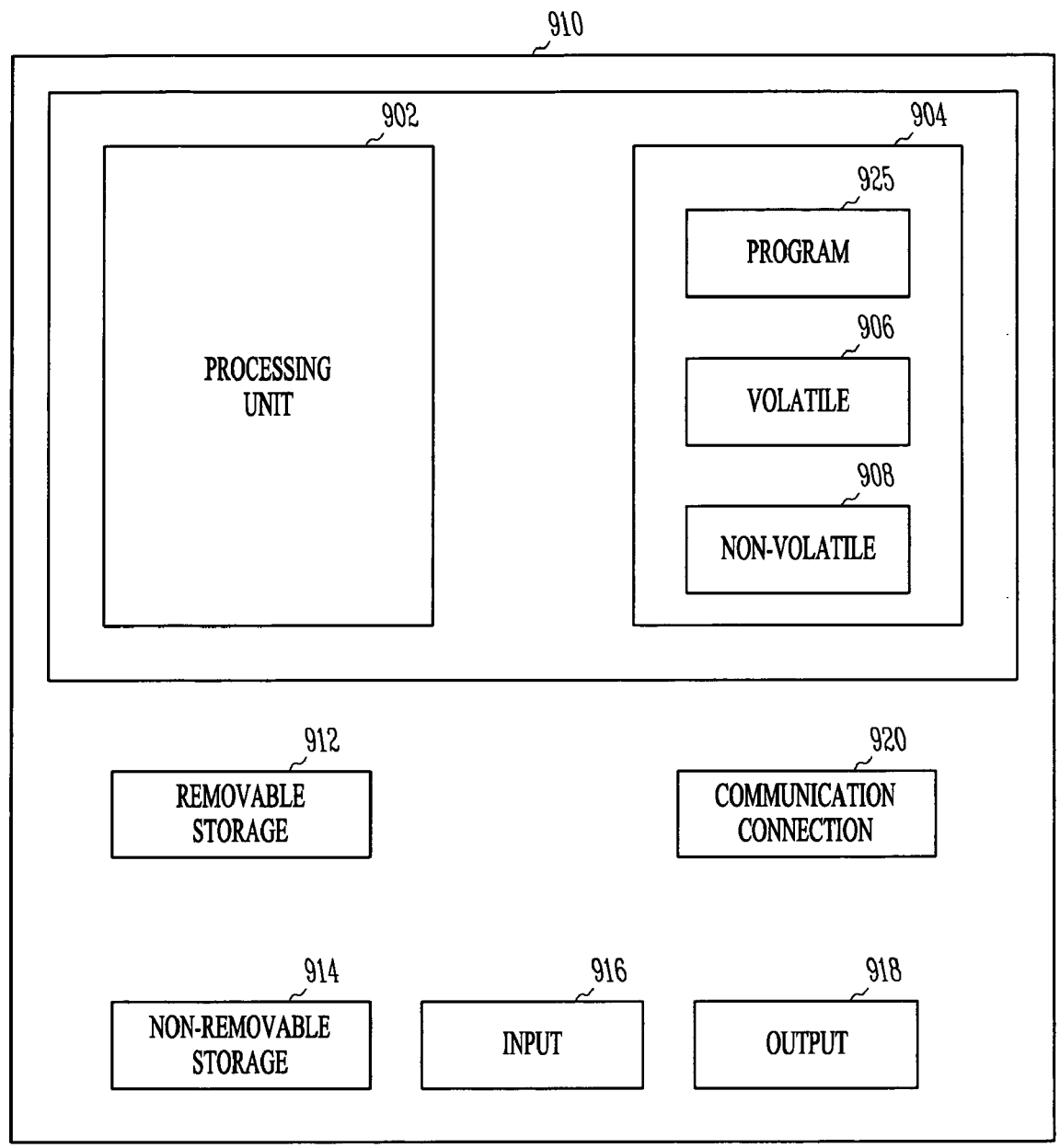
FIG. 9 is a block diagram of an example computer system for providing audio instruction according to an example embodiment.

A block diagram of a computer system that executes programming for performing the above algorithm is shown in FIG. 9. A general computing device in the form of a computer 910, may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 910. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A device for assisting a human user in performing processes, the device comprising:
 a headset including a speaker that provides audible instructions to the user corresponding to multiple tasks associated with performing the process;
 a storage device that stores data corresponding to the audible instructions; and
 a processor that converts the stored data to the audible instructions;
 wherein the headset further includes an input device adapted to enable the user to control the provision of the audible instructions, wherein the processes relate to a manufacturing equipment changeover, and wherein the processor includes a program that allows selection of a set of audible instructions to change an assembly line from being set up to produce a current product to produce a second product to be produced on the assembly line.

2. The device of claim 1 wherein the stored data includes temporal information related to the rate of providing the instructions for the multiple tasks.

3. The device of claim 1 wherein the stored data includes different sets of tasks for the process corresponding to different user experience levels in performing the process.

4. The device of claim 1 wherein the speaker comprises a transceiver wirelessly coupled to the processor.

5. The device of claim 4 wherein the input device accepts voice commands from the user.

6. The device of claim 5 wherein the voice commands are selected from the group consisting of stop, go and back.

7. The device of claim 1 wherein the processor provides a list of the tasks and a status as the audible instructions are being provided.

8. The device of claim 1 wherein the processor provides an interface to jump to a task and automatically mark previous tasks as completed.

9. The device of claim 1 wherein the processor provides an interface to define tasks and descriptions to be audibly provided.

10. The device of claim 9 wherein the processor interface further facilitates defining times associated with each task.

11. The device of claim 9 wherein the processor interface provides for selection of a voice recognition profile or a training mode to generate a voice recognition profile for each user.

12. The device of claim 1 wherein the speaker comprises a transceiver and a microphone for accepting audible commands and wirelessly communicating with the processor.

13. A device for assisting a human user in performing processes, the device comprising:
   a headset including a speaker for providing audible instructions to the user corresponding to multiple tasks associated with performing the process;
   a storage device that stores data corresponding to the audible instructions; and
   means for converting the stored data to the audible instructions;
   wherein the headset includes means for enabling the user to control the provision of the audible instructions, wherein the processes relate to a manufacturing equipment changeover, and wherein the processor includes a program that allows selection of a set of audible instructions to change an assembly line from being set up to produce a current product to produce a second product to be produced on the assembly line.

14. The device of claim 13 wherein the stored data includes temporal information related to the rate of providing the instructions for the multiple tasks.

15. The device of claim 13 wherein the stored data includes different sets of tasks for the process corresponding to different user experience levels in performing the process.

16. The device of claim 13 wherein the means for providing audible instructions to the user comprises a transceiver wirelessly coupled to the processor.

17. The device of claim 16 wherein the transceiver sends voice commands from the user to the processor.

18. The device of claim 17 wherein the voice commands are selected from the group consisting of stop, go and back.

19. A method of performing a process using a headset that provides audible instructions, the method comprising:
   retrieving instructions from a computer processor for multiple tasks for the process responsive to selection of a process to be performed;
   providing audible instructions for the tasks using the computer processor;
   wherein the computer processor responds to audible user commands to stop, go back, and go in providing the audible instructions, wherein the processes relate to a manufacturing equipment changeover, and wherein the processor includes a program that allows selection of a set of audible instructions to change an assembly line from being set up to produce a current product to produce a second product to be produced on the assembly line.

* * * * *